July 25, 1939.   G. KAUFMAN   2,167,438
APPARATUS FOR MANUFACTURE OF WAX POLISHING COMPOSITIONS
Filed Oct. 15, 1935
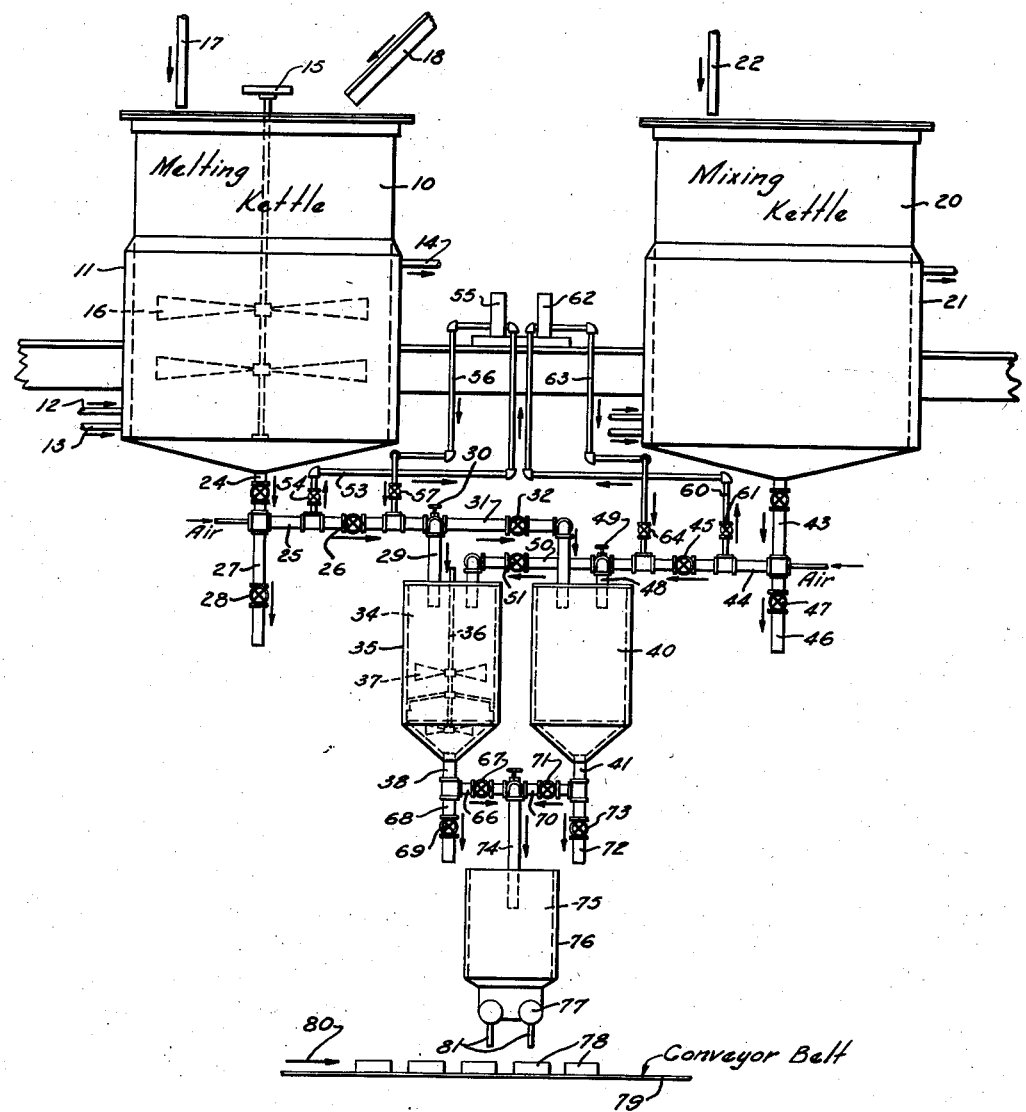
Gus Kaufman
INVENTOR
BY R J Dearborn
his ATTORNEY Patented July 25, 1939

2,167,438

UNITED STATES PATENT OFFICE 2,167,438

APPARATUS FOR MANUFACTURE OF WAX POLISHING COMPOSITIONS

Gus Kaufman, Beacon, N. Y., assignor to The Texas Company, New York, N. Y., a corporation of Delaware Application October 15, 1935, Serial No. 45,047

1 Claim. (Cl. 134—24)

This invention relates to the manufacture of wax polishing compositions, and more particularly to apparatus for preparing such polishes.

Wax polishing compositions may comprise a water-oil emulsion containing wax and an emulsifying agent. It has heretofore been a general practice to manufacture such compositions in a batch procedure, where the various ingredients are added to a mixer or emulsifier and agitated until emulsion is effected. This has proven satisfactory where the polish is produced in comparatively small volume. However, large capacity production requires a large number of kettles and emulsifiers.

It is an object of the present invention to provide apparatus for continuously manufacturing such a polish, whereby comparatively large capacity production is obtained with a minimum of installation expense.

In the drawing, the single figure illustrates in elevation and partial section a preferred embodiment of apparatus for carrying out the method of the present invention.

In accordance with the method of the present invention, the wax and hydrocarbon thinner are heated together in a melting kettle. A water solution of an emulsifying agent is prepared in a separate kettle. These respective liquids or solutions are withdrawn in controlled and proportioned streams into an emulsifier where they are mixed and agitated at high speed to form an emulsion. A controlled stream of the emulsion is continuously withdrawn from the emulsifier to maintain a desired level therein. The withdrawn stream is passed to an accumulating tank feeding to a filling mechanism which serves to fill containers with the prepared polish. These containers are moved past the filling zone on a conveyor belt which then carries them through a cooling zone. In the case of solid emulsion polishes, the emulsion is allowed to set in the containers as they are moved on the conveyor belt through the cooling zone. The containers are then capped and packaged in cartons or in any other suitable manner for shipment.

Referring to the drawing, a melting kettle is indicated at 10 provided with a jacket 11 to which steam may be supplied by line 12 for heating purposes, and cooling water supplied by inlet and outlet lines 13 and 14 for cooling purposes. The kettle may be an open top vat equipped with a stirrer comprising a central vertical shaft 15 carrying paddles 16 and driven in any suitable manner (not shown). Hydrocarbon thinner is supplied to the kettle by line 17, and wax may be introduced through feed chute 18.

A second mixing kettle 20 is also provided, which is equipped with a similar heating and cooling jacket 21, and agitator (not shown), and an inlet pipe 22 for the introduction of water. Emulsifying agent is added in any suitable manner.

Kettle 10 is provided with a valve controlled discharge line 24 communicating either with line 25 containing valve 26 or drain line 27 containing valve 28. Line 25 in turn communicates with either line 29 containing valve 30 or line 31 containing valve 32. Line 29 discharges into the upper portion of an emulsifier 34 equipped with a steam heating jacket 35, a high speed shaft 36 carrying emulsifying blades 37, and a bottom discharge line 38. Line 31 in turn communicates with a second emulsifier 40 constructed similarly to emulsifier 34 and provided with bottom discharge line 41.

Kettle 20 is provided with valve controlled bottom discharge line 43 communicating with either line 44 containing valve 45 or drainage line 46 containing valve 47. Line 44 communicates with either line 48 containing valve 49 and discharging into emulsifier 40, or line 50 containing valve 51 and discharging into emulsifier 34.

Branching off of line 25 is a by-pass 53 provided with valve 54 and leading to the suction side of a proportioning pump 55, the discharge of which passes through line 56 containing valve 57 back into line 25 beyond valve 26. A similar by-pass 60 provided with valve 61 branches off of line 44 and leads to a second proportioning pump 62, the discharge side of which feeds through line 63 containing valve 64 back into line 44 on the far side of valve 45. Proportioning pumps 55 and 62 are driven in coordinated relationship by any suitable means (not shown).

Discharge line 38 from emulsifier 34 communicates either with line 66 containing valve 67 or drain line 68 provided with valve 69. Likewise, discharge 41 from emulsifier 40 communicates with either line 70 containing valve 71 or drain line 72 containing valve 73. Lines 66 and 70 communicate with a common discharge 74 feeding into an accumulator tank 75 provided with a steam heating jacket 76. Accumulator tank 75 is associated with and feeds into a conventional filling mechanism indicated diagrammatically at 77. Suitable containers 78 are moved past the filling mechanism 77 on a conveyor belt 79. This belt may be driven in any suitable conventional manner so as to have an intermittent forward feed in the direction of the arrow 80 to thereby bring the containers opposite the filling spouts 81, where they are filled. Further movement of the conveyor belt then carries the filled containers from beneath the filling mechanism and through a cooling zone, which may be merely an exposed air cooled zone, or may be a suitable cooling tunnel (not shown) to which fluid cooling medium is supplied.

For purposes of illustrating the method of the present invention, it is described in detail in connection with the manufacture of a polish having the following composition:

| | Percent by weight |
|---|---|
| Carnauba wax | 12.50 |
| Ammonium linoleate | 0.75 |
| Water | 36.72 |
| Petroleum thinner or kerosene | 50.00 |
| Dye | 0.03 |

A solid wax emulsion polish of the above character is disclosed and claimed in United States Letters Patent No. 2,071,027, issued February 16, 1937.

In the manufacture of this polish, the wax and kerosene thinner are added to melting kettle 10. Steam is admitted to the jacket while the contents of the kettle are agitated by stirrer 15, until the wax has melted. At the same time, the water, emulsifier which in this case is ammonium linoleate and the dye are added to kettle 20, which is heated by steam jacket until solution is effected. The contents of both kettles are then cooled down to about 145–160° F. by circulating cooling water through connections 13—14.

The proportioning pumps 55 and 62 are then started, valves 24, 54, 57, 30, 43, 61, 64 and 51 being open, and the remaining valves closed. In this case, pump 55 will take suction on the bottom of melting kettle 10, withdrawing a controlled stream of the hydrocarbon thinner and wax melt through lines 24, 25, 53, 56, 25 and 29 and discharging into emulsifier 34. At the same time pump 62 will take suction on the bottom of mixing kettle 20 and discharge a controlled stream of water solution to emulsifier 34 through lines 43, 44, 60, 63, 44 and 50 into emulsifier 34. Here the ingredients are subjected to high speed agitation, while being maintained at approximately 145–160° F. by the steam jacket 35. An emulsion is thus formed, which is continuously discharged through lines 38, 66 and 74 into accumulator tank 75 to maintain a desired liquid level within the emulsifier 34. In this case, valve 67 is open and the remaining valves on the discharge lines from the emulsifiers are closed. At the temperatures given, it is found that a very short time of agitation, such as about 1 to 5 minutes, is sufficient to give a stable emulsion.

The temperature of the emulsion is maintained in accumulator tank 75 by the steam jacket 76. This emulsion feeds from the lower part of the accumulator tank into a filling mechanism 77, which may be of any suitable conventional construction. The filling mechanism discharges into containers 78 which are then carried on the conveyor belt through the cooling zone to allow the emulsion to cool and set to a solid consistency in the containers.

A plurality of emulsifiers 34—40 are provided to allow for fluctuating rates of discharge from the emulsifier to the filling equipment, without shutting down the proportioning pumps. During normal operation, only one emulsifier will be used and a controlled liquid level maintained therein by regulation of the discharge rate from the emulsifier to the filling equipment. However, should temporary stoppage of the conveyor belt occur, or some difficulty arise in the proper functioning of the filling mechanism, necessitating temporary shut-down of the filling mechanism and conveyor belt, the supply of streams from the proportioning pumps 55 and 62 can be diverted into the other emulsifier 40 by suitable manipulation of the valves, to prevent overflow in emulsifier 34.

The proportioning pumps 55 and 62 are arranged in by-pass lines to enable these pumps to be by-passed, and allow gravity feed from the melting and mixing kettles to the emulsifiers, which latter are arranged at a lower elevation than the kettles for this purpose. In the manufacture of thin liquid polishes, it may be more convenient to employ the gravity flow. This is accomplished by suitable manipulation of the valves, to allow the wax and hydrocarbon thinner to feed directly to lines 24, 25 and 29 into emulsifier 34, and to allow the water solution of emulsifying agent to feed directly through lines 43, 44 and 50 into emulsifier 34.

While the invention has been specifically described in connection with the manufacture of one type of wax polish, it is to be understood that the method and apparatus are applicable to the manufacture of various types of emulsion polishes.

Obviously many modifications and variations of the invention, as hereinbefore set forth, may be made without departing from the spirit and scope thereof, and therefore only such limitations should be imposed as are indicated in the appended claim.

I claim:

Apparatus for the continuous manufacture of a wax polish, comprising in combination separate kettles for forming a melt of wax and hydrocarbon thinner and a water solution of emulsifying agent, heating and cooling means for said kettles, an emulsifier positioned at an elevation below that of the kettles, gravity flow lines for feeding controlled and proportioned streams from the kettles into the emulsifier, a by-pass in each said flow line, a proportioning pump arranged in the by-pass in each gravity flow line, valves for controlling flow either through the proportioning pump or through the gravity flow lines, a filling mechanism, means for continuously discharging formed emulsion from the emulsifier to the filling mechanism, and a conveyor for moving containers past the filling mechanism where they are filled with the formed emulsion.

GUS KAUFMAN.